CARRIER TELEPHONE SYSTEMS

Filed Jan. 26, 1959 6 Sheets-Sheet 1

INVENTOR
HARRY B. LAW,
BY Hall & Houghton
ATTORNEY

May 14, 1963 H. B. LAW 3,089,920

CARRIER TELEPHONE SYSTEMS

Filed Jan. 26, 1959 6 Sheets-Sheet 2

INVENTOR
HARRY B. LAW,
BY Hall & Houghton
ATTORNEY

May 14, 1963 H. B. LAW 3,089,920

CARRIER TELEPHONE SYSTEMS

Filed Jan. 26, 1959 6 Sheets-Sheet 3

INVENTOR
HARRY B. LAW,
BY Hall & Houghton
ATTORNEY

INVENTOR
HARRY B. LAW,
BY Hall & Houghton
ATTORNEY

INVENTOR
HARRY B. LAW,
BY *Hall & Houghton*
ATTORNEY

INVENTOR
HARRY B. LAW,
BY Hall & Houghton
ATTORNEY

United States Patent Office 3,089,920
Patented May 14, 1963

3,089,920

CARRIER TELEPHONE SYSTEMS

Harry Bernard Law, Watford, England, assignor to Her Majesty's Postmaster General, London, England Filed Jan. 26, 1959, Ser. No. 788,957
Claims priority, application Great Britain Jan. 31, 1958
10 Claims. (Cl. 179—15)

Multi-channel carrier telephone systems usually have substantial gaps between adjacent channels of the carrier-frequency bands used for speech transmission. For example, channels are spaced at 4-kc./s. intervals in a well known arrangement in which channels transmit speech signals in the frequency range 300–3400 c./s. Out of the 4000-c./s. bandwidth provided for each channel on the carrier system only 3100 c./s. are effectively used for speech transmission in the arrangement just referred to. The arrangement is not necessarily wasteful, for the inter-channel gaps provide frequency intervals in which the filters used to separate the channels can develop their attenuation, in passing from their pass band to their stop band. Generally, the larger the gaps the cheaper are the filters. The gaps also accommodate the channel carrier leaks at points where, being well outside the bands used for speech transmission, they cannot cause audible interference. The term "carrier leak" is applied to energy at the carrier frequency which appears at points in the system where it is undesired. If, however, a carrier transmission system is very long, or is otherwise expensive, so that line costs represent a substantial part of the total cost per channel, it becomes important that loss of bandwidth on the system be minimized.

An object of the present invention is to provide carrier terminal equipment for a carrier system in which a much more efficient utilization of the bandwidth of the carrier transmission line is possible.

With the qualities of components currently available, the interchannel gaps may be reduced to about 5% of the channel bandwidth. Features of the system of the present invention are, first, the use of speech-frequency filters prior to a channel modulator and subsequent to a channel demodulator to define sharply the pass band of the channel. Secondly, the channel carrier leak of a channel falls in the frequency band used to transmit the speech signals of an adjoining channel, narrow-band stop-filters being associated with the channel band-pass filters at the sending end, to reduce channel carrier leaks to acceptably low levels.

Figures 1A, 1B:
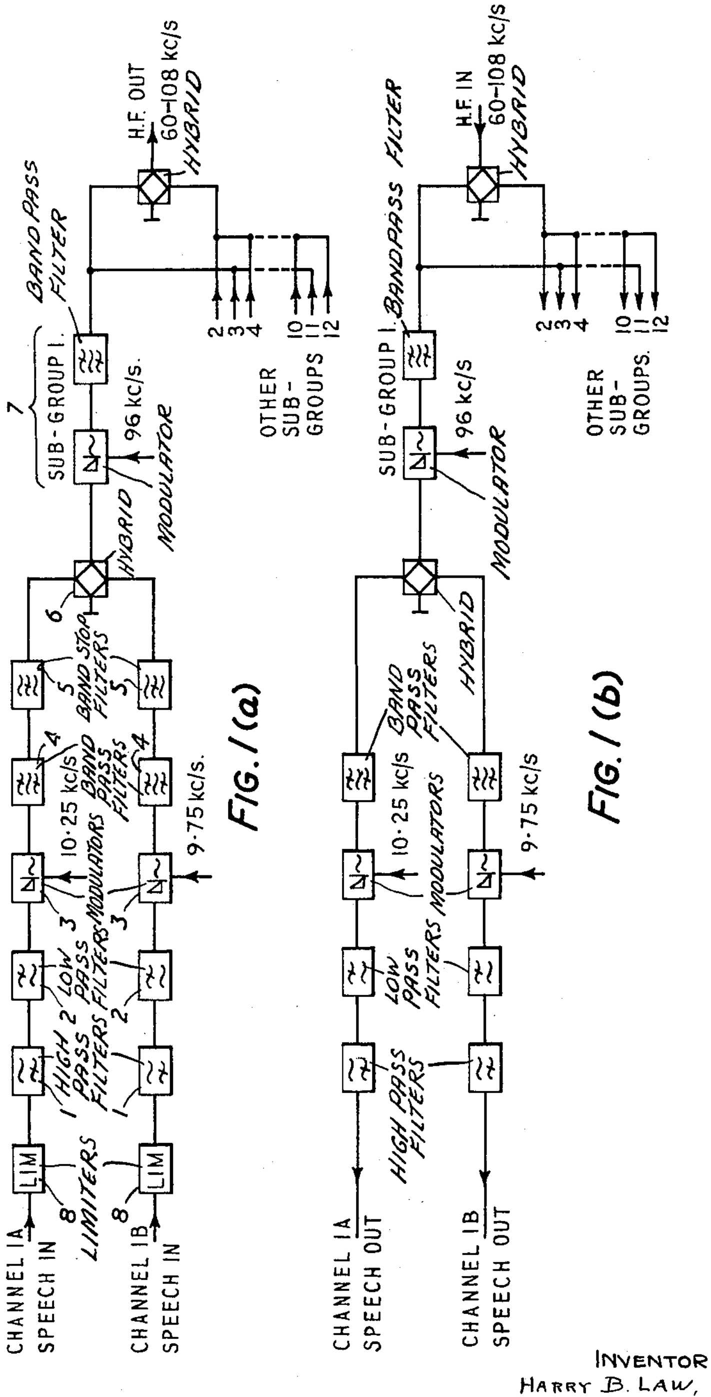

FIG. 1(*a*) shows schematically part of the arrangement of a transmit carrier terminal of a system in which 24 channels are obtained in the basic group frequency band 60–108 kc./s. Incoming speech signals in the frequency band 300–2200 c./s. are passed by the high-pass and low-pass filters 1, 2 to a channel modulator 3, where they modulate a carrier of frequency 10.25 kc./s. (A channel) or 9.75 kc./s. (B channel). In the A channel, the lower sideband 8.05–9.95 kc./s. is selected by a band-pass filter 4 (the channel filter), and the 10.05–11.95 kc./s. upper sideband of the B channel is similarly selected. Band-stop filters 5 suppress the 9.75 kc./s. and 10.25 kc./s. carrier leaks. The A and B channels are then combined to form a two-channel sub-group, 8–12 kc./s. bandwidth approximately, combination being by means of a hybrid coil 6 as is shown, though other means of combination are possible. By further modulation and filtration in conventional equipment 7 the sub-group is translated to any desired point in the 60–108 kc./s. band.

A limiter 8 is shown between the speech input and the high-pass and low-pass filters in FIG. 1 (*a*). This is a preferred arrangement which prevents over-loading of the modulator and of the multichannel transmission system by high-level speech signals; in the absence of the limiter unwanted modulation products could arise and cause interference in adjacent channels.

The process in the receiving terminal is the reverse of that described for sending and is shown in FIG. 1(*b*), but no carrier band-stop filters corresponding with 5 are needed.

Figure 2:
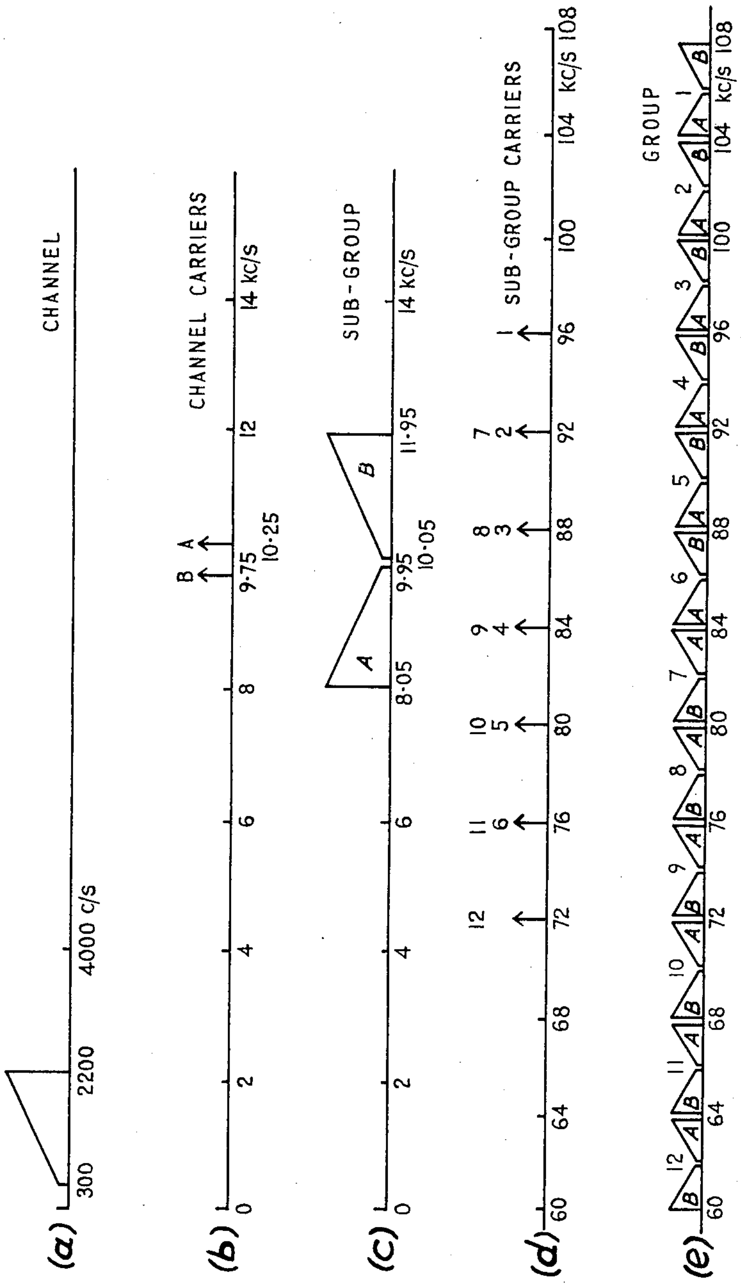

FIG. 2 shows the frequency allocations. FIG. 2(*a*) shows the audio waveband of a single channel as applied to the modulator 3. FIG. 2(*b*) shows the channel carriers of the channels 1A and 1B whilst FIG. 2(*c*) shows the outputs of the channels applied to the hybrid transformer 6. The sharp cut-off of the filters enables the spacing between channels to be reduced and from FIG. 2(*c*) it can be seen that the spacing between channels 1A and 1B is .1 kc./s. There will be a similar spacing between the channels 1A, 1B. FIG. 2(*d*) shows the distribution of sub-group carriers amongst the channels and by appropriate arrangement of sub-groups as shown in FIG. 1(*a*) and the transmission of upper or lower sidebands the frequency spectrum of FIG. 2(*e*) is obtained. FIG. 2(*e*) shows clearly that inter-band gaps are minimized but, at the same time, they allow sufficient frequency range for filters at present available to develop and reduce their attenuation. The carrier leak of one channel falls in the frequency band of an adjoining channel.

Other arrangements of the sidebands, differing from that shown in FIG. 2, are possible; the arrangement shown is particularly suitable for use on line systems designed to carry normal 4-kc./s. carrier channels. Such line systems often include filters which affect transmission in the neighbourhood of some of the 4-kc./s. points, 60, 64, 68 kc./s. etc., and with the arrangement of FIG. 2 these will affect only the higher audio frequencies of the 2-kc./s. channels.

Figures 3A, 3B:
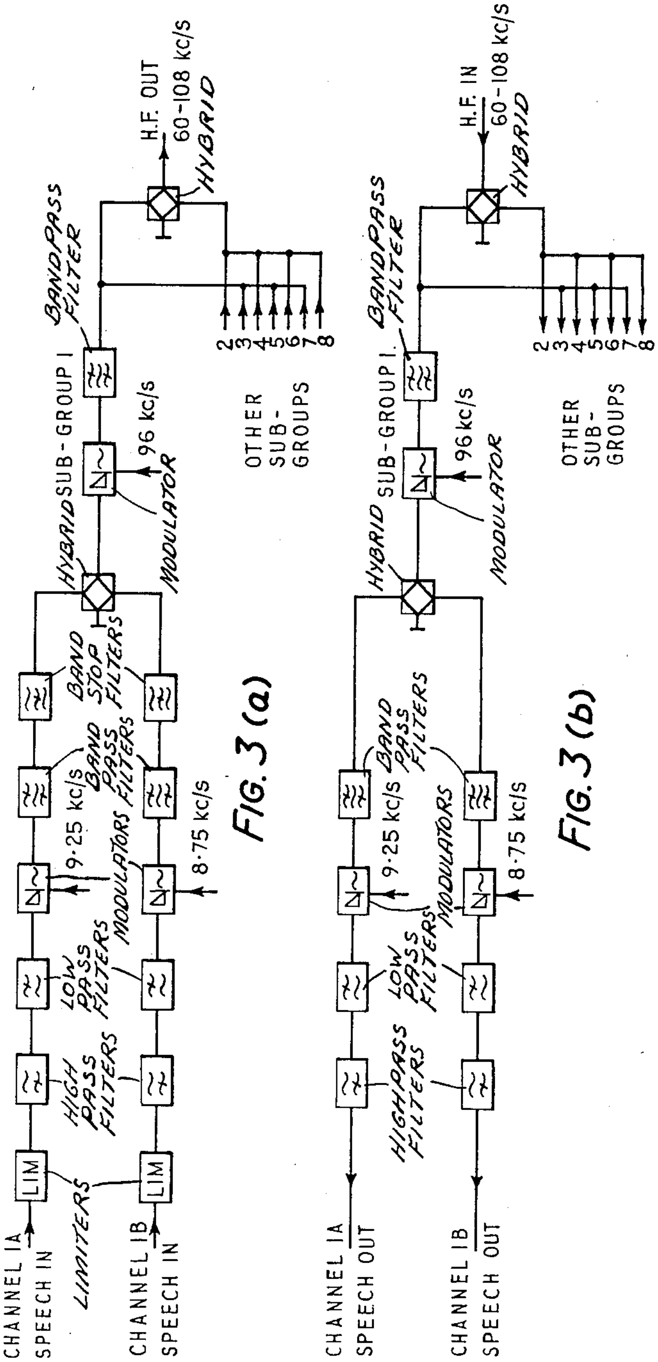
Figure 4:
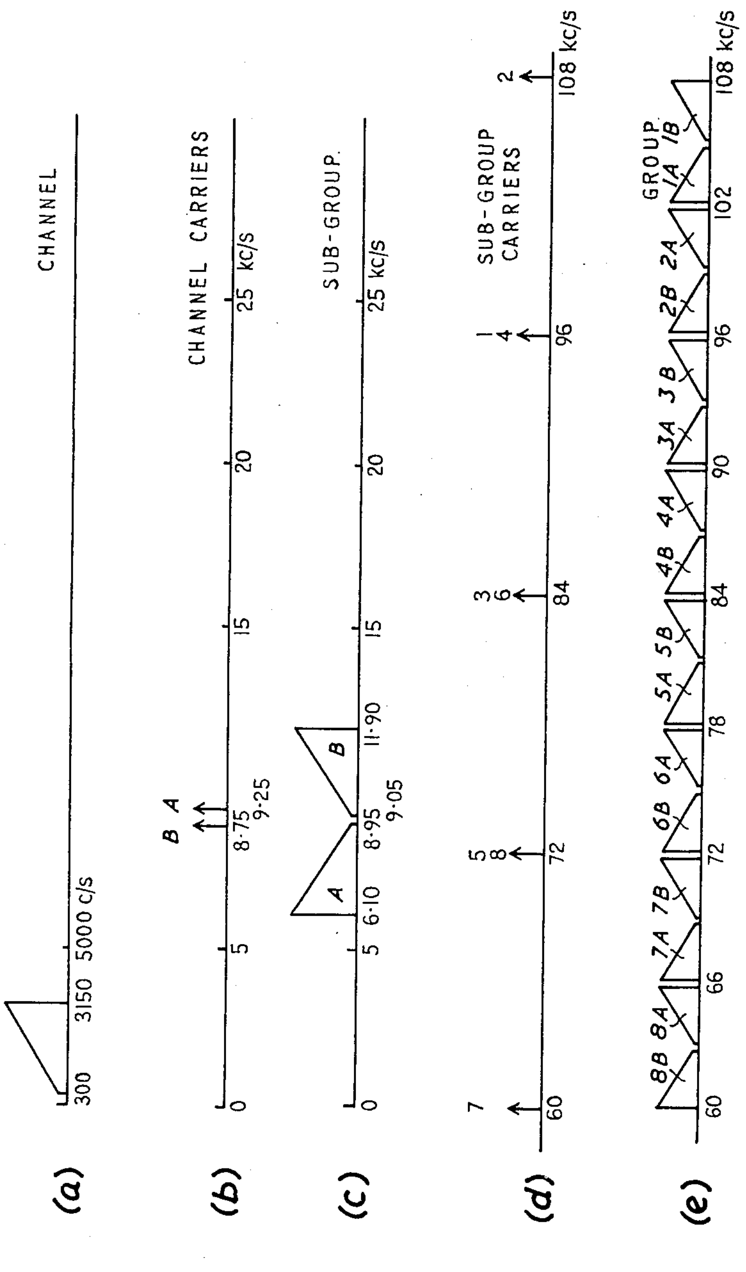

FIGURES 3(*a*) and (*b*) and 4 show the arrangement of the equipment and the frequency allocation of another carrier terminal, giving 16 channels 300–3150 c./s. approximately in the frequency band 60–108 kc./s. The high-pass and low-pass filters pass speech signals in the frequency range 300–3150 c./s. approximately and a two-channel sub-group is assembled in the frequency band 6–12 kc./s., using carriers at 8.75 and 9.25 kc./s. and approximately band-pass and band-stop filters. Further modulation in a conventional manner translates the sub-group to a desired point in the 60–109 kc./s. band. The layout of FIGS. 3(*a*), (*b*) and 4 is similar to that of FIG. 1(*a*), (*b*) and 2 and will not be further described.

Figure 5:
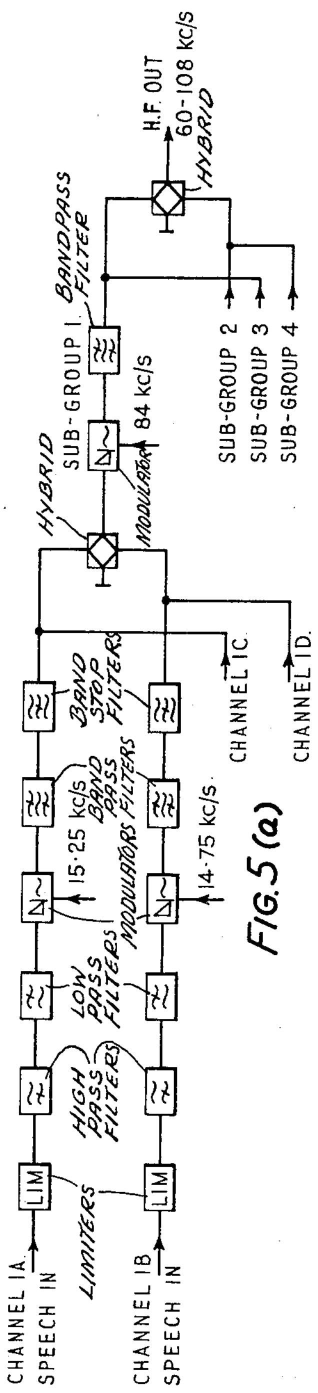
Figure 5:
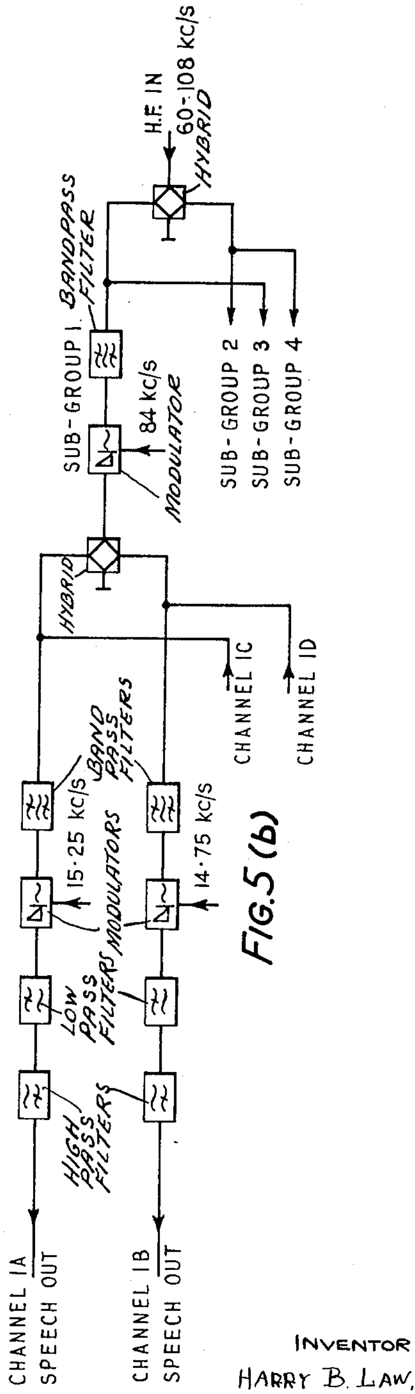

Another arrangement using a four-channel sub-group in the frequency range 12–24 kc./s. is illustrated in FIGS. 5(*a*), (*b*) and 6. Other arrangements are possible, one, for example, using a four-channel sub-group 6–18 kc./s. requires only two sub-group carrier frequencies, 78 kc./s. and 90 kc./s., to form the 60–108 kc./s. group. The layout of FIGS. 5(*a*), (*b*) and 6 is similar to that of FIGS. 1(*a*), (*b*) and 2.

In the foregoing description, to facilitate understanding, particular frequencies have been referred to, but in generalizing, the frequencies of two adjacent carriers—such as the 10.25 kc./s. and 9.75 kc./s. carriers of channels 1A and 1B in FIGS. 1(*a*) and 2(*b*)—may be termed $C^1$ and $C^2$ respectively; the lowest audio frequency to be transmitted— 300 cycles per second in FIG. 2(*a*)—may be termed $n$, and the range of audio frequency—300 to 2200 cycles per second in FIG. 2(*a*)—may be termed $x$ and is wider than the frequency $n$. It will then be apparent that the difference in frequency between the adjacent carrier frequencies $C^1$ and $C^2$, e.g. carriers A and B, 500 cycles in the form shown, is selected to be greater than $n$ (300 cycles) and less than $2n$ (600 cycles)

by an amount to constitute the frequency gap (100 cycles) to be maintained between the proximate side bands (FIG. 2c), such gap being equal to the amount by which $2n$ (600 cycles) exceeds the difference $(C^1-C^2)$ between the frequencies of adjacent carriers (500 cycles).

Figure 6:
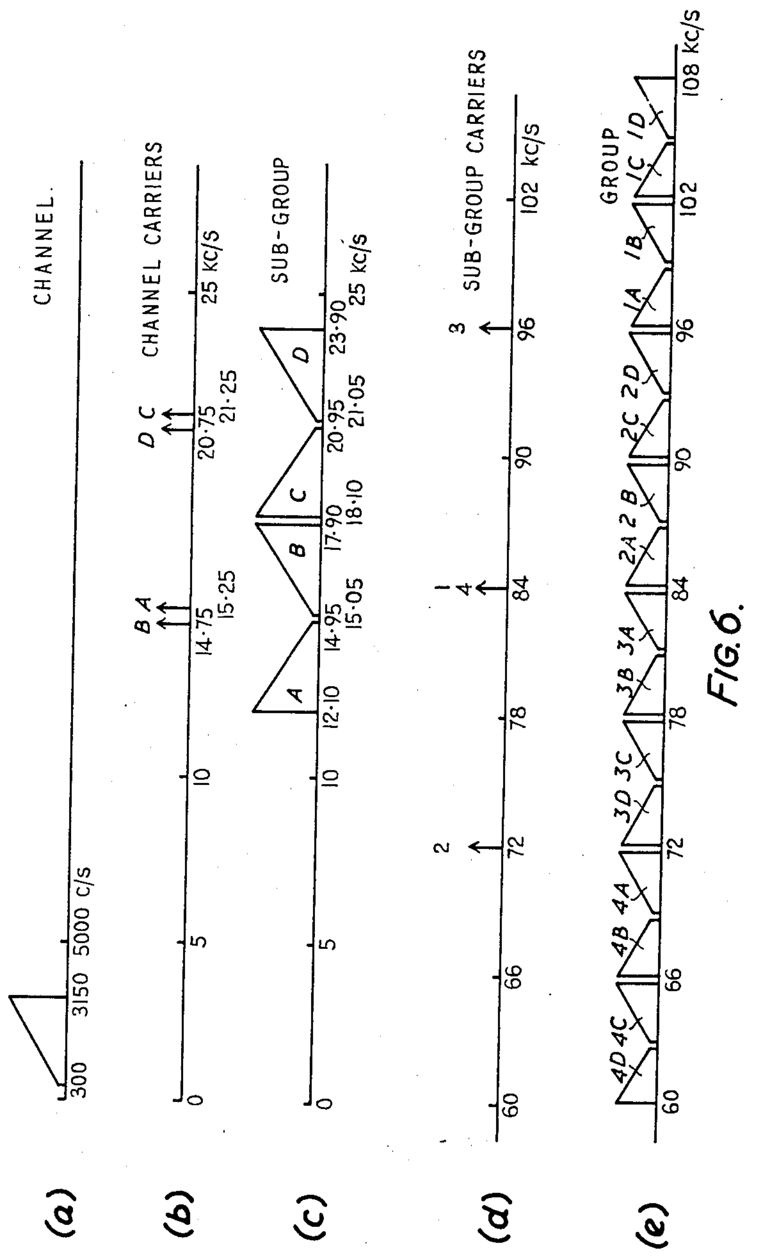

Also it will be apparent from consideration of FIG. 6(c) wherein $x$ equals 3150 less 300, or 2800 cycles per second that when four such channel modulated carriers are to be combined into a subgroup, the frequencies of the third and fourth carriers C and D are selected with the same relation to $n$ as are the frequencies of carriers A and B, and are spaced from A and B in frequency, respectively, by an amount equal to $2x+n+y$, wherein $y$ is the gap between the higher frequency ends of the side bands B and C, which in FIG. 6(c) is shown as 0.20 kc./s., as compared with the 0.10 kc./s. value of $n$.

The assemblies of basic 60–108 kc./s. groups of 2 or 3-kc./s. channels are given as examples. Other arrangements with different or non-uniform channel spacings, or in other parts of the carrier-frequency spectrum, or with more or fewer stages of modulation, are possible. The diagrams showing the arrangement of the equipment include only those items that are necessary for the purpose of explanation; other items, such as pads, equalisers, amplifiers and attenuators, which would probably be needed in practical equipment, are omitted.

I claim:

1. The method of increasing the efficiency of utilization of the frequency spectrum in single side band carrier telephony, which method comprises reducing the frequency gaps between transmitted adjacent single side band channels to such band widths that a frequency equivalent to the carrier frequency giving rise to one of said transmitted single side band channels lies within the frequency band width of an adjacent transmitted single side band channel, and in transmitting said adjacent single side band channels each to the exclusion of the carrier frequency giving rise thereto.

2. The method of transmitting in closely proximate frequency channels first and second audio frequency signals each having a frequency range wherein the lowest audio frequency to be transmitted is a frequency of $n$ cycles per second, which method comprises:

(a) supplying for said first audio frequency signal a carrier of frequency $C^1$ and supplying for said second audio frequency signal a carrier of a lower frequency $C^2$ differing from frequency $C^1$ by a value greater than $n$ and less than $2n$;

(b) modulating said carriers $C^1$ and $C^2$ with said first and second audio frequency signals, respectively, thereby producing for each audio frequency signal upper and lower side bands equivalent in width to the audio frequency range thereof, with the upper side band from said first audio frequency modulation and the lower side band from said second audio frequency modulation mutually proximate and separated by a frequency gap of a width less than the frequency $n$, and with the other two of said side bands mutually remote;

(c) thereafter suppressing from each modulation signal the carrier frequency producing it and the said remote side band, and (d) transmitting said mutually proximate side bands separated by the frequency gap of less than the frequency $n$.

3. The method of claim 2, further comprising the step of limiting the level of said audio frequency signals before employing them in step (b), to prevent over-loading.

4. The method of increasing the efficiency of utilization of the frequency spectrum in single side band carrier telephony, which method comprises correlating the frequencies $C^1$ and $C^2$ of adjacent carriers with the lowest frequency $n$ of the audio frequency signals to be transmitted thereby according to the relationship $C^1-C^2=Kn$ wherein K is a factor greater than 1 and less than 2, modulating said adjacent carriers with said audio frequency signals respectively to produce the two pairs of side bands with the upper side band of the lower frequency carrier and the lower side band of the higher frequency carrier constituting a proximate pair of side bands separated by a frequency gap of the order of $(2\text{-}K)\cdot(n)$ and each embracing within its frequency range a frequency equivalent to the carrier frequency modulated to produce the other, suppressing from said modulated signals the carrier leaks and the side bands other than said proximate side bands, and transmitting said proximate side bands separated by the frequency gap of the order of $(2\text{-}K)\cdot(n)$.

5. The method of claim 4, wherein said carrier frequencies are correlated as aforesaid with said factor K of the order of $\frac{5}{3}$, so that the frequency gap separating said proximate side bands is of the order of $\frac{1}{3}$ $n$.

6. A system for transmitting, in closely proximate frequency channels, first and second audio-frequency signals each having a frequency range wherein the lowest audio frequency to be transmitted is a frequency of $n$ cycles per second, said system comprising:

(a) a first audio circuit and means for impressing said first audio frequency signal thereon;

(b) a second audio circuit and means for impressing said second audio frequency signal thereon;

(c) first and second modulators for said first and second audio circuits, respectively;

(d) means for supplying to said first modulator a carrier current of frequency $C^1$;

(e) means for supplying to said second modulator a carrier current of a lower frequency $C^2$ differing from frequency $C^1$ by a value greater than $n$ and less than $2n$;

(f) means for connecting said first and second audio circuits to said modulators for applying said first and second audio signals to modulate said carriers $C^1$ and $C^2$ respectively, thereby producing for each audio frequency signal upper and lower side bands equivalent in band width to the audio frequency range thereof with the lower side band from said first audio frequency modulation and the upper side band from said second audio frequency modulation mutually proximate and separated by a frequency gap of a width less than the frequency $n$, and with the other two of said side bands mutually remote;

(g) a common output circuit;

(h) band-pass filter means connected between each of said modulators and said output circuit, respectively, for preventing transmission of said mutually remote side bands to said output circuit, and (i) band stop filter means connected between each of said modulators and said output circuit, respectively, for preventing transmission to said output circuit of the carrier frequency supplied to the modulator in its circuit, said band pass filter means and said band stop filter means permitting transmission to said common output circuit of said relatively proximate side bands separated by the frequency gap of less width than the frequency $n$, and each including a carrier frequency equivalent to that which gave rise to the other.

7. A system according to claim 6, in which each audio circuit further includes means for limiting the amplitude of the audio frequency signals applied to the modulator connected thereto.

8. A system according to claim 6, in which each audio circuit further includes a high-pass filter means for limiting to the value $n$ the lowest audio frequency passed to the modulator connected thereto.

9. A system according to claim 8, in which each audio circuit also includes a low-pass filter means for limiting the highest audio frequency passed to the modulator connected thereto.

10. A transmission system comprising, in combination, a plurality of communication channels, each including:

(a) means for modulating an information signal fed into a channel for generating a single side band, (b) two carrier signal source means each connected to a modulating means, said two carrier signal source means having a difference in frequency which provides a frequency gap between the modulated side bands of different channels which is less than the lowest information signal frequency to be transmitted in any channel and with the carrier signal frequency of one channel being within the modulated single side band of another channel; and (c) means for preventing, in each channel, further transmission of the carrier frequency signal of this channel.

References Cited in the file of this patent

UNITED STATES PATENTS

| | | |
|---|---|---|
| 2,408,462 | Wise | Oct. 1, 1946 |
| 2,832,817 | Raibourn | Apr. 29, 1958 |
| 2,855,462 | Adams | Oct. 7, 1958 |